(No Model.)

C. W. EDDY.
PHOTOGRAPHIC CAMERA SHUTTER.

No. 512,671. Patented Jan. 9, 1894.

Witnesses:
B. C. Tiffany
Fenelon B. Brock

Inventor:
Charles W. Eddy
per Fred E. Tasker
Atty.

THE NATIONAL LITHOGRAPHING COMPANY,
WASHINGTON, D. C.

UNITED STATES PATENT OFFICE.

CHARLES W. EDDY, OF WARE, ASSIGNOR, BY MESNE ASSIGNMENTS, TO THE BLAIR CAMERA COMPANY, OF BOSTON, MASSACHUSETTS.

PHOTOGRAPHIC-CAMERA SHUTTER.

SPECIFICATION forming part of Letters Patent No. 512,671, dated January 9, 1894.

Application filed January 14, 1889. Serial No. 296,254. (No model.)

*To all whom it may concern:*

Be it known that I, CHARLES W. EDDY, of Ware, in the county of Hampshire and State of Massachusetts, have invented a certain new and useful Improvement in Photographic Cameras, of which the following is a specification.

My invention relates more particularly to shutters for photographic cameras and it consists in the construction and novel combination of parts as hereinafter set forth.

Figure 1:
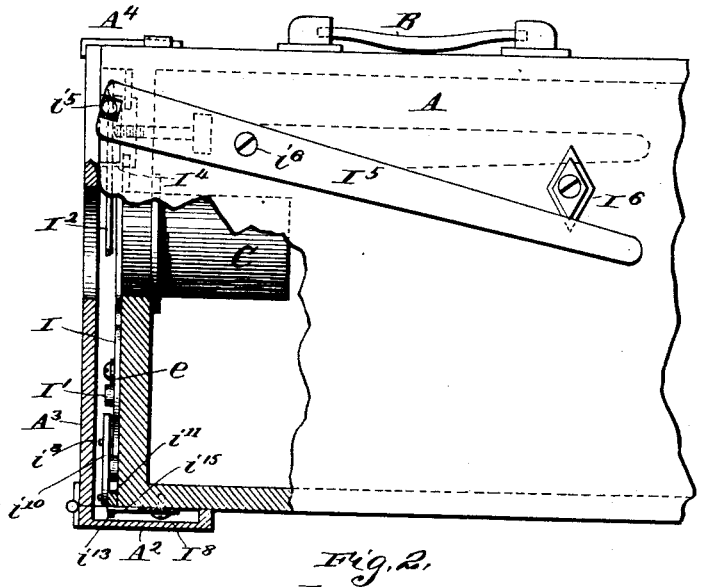
Figure 2:
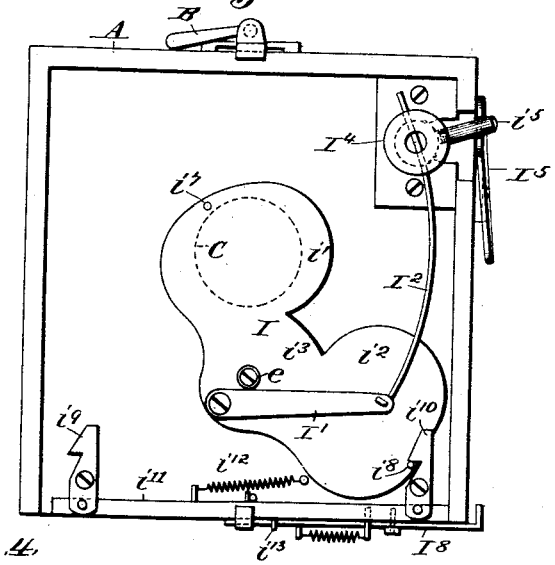
Figure 4:
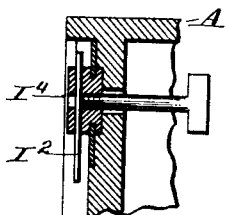
Figure 3:
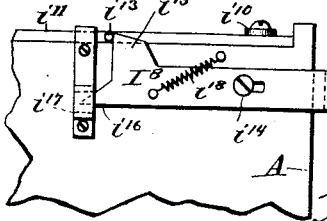

In the accompanying drawings Figure 1 is a side view of a camera partly in section, embodying my improvement. Fig. 2 is a front view thereof with the front piece or cover removed. Fig. 3 is a bottom view showing a portion of the operating mechanism and Fig. 4 is a detail of the operating mechanism, secured to the front of the camera.

Referring by letter to the drawings, A designates the body of a camera of any well known construction, but preferably of that class known as the box camera designed to be carried in the hand, a loop or handle B being provided for convenience of carrying.

C designates a lens tube fastened to the front of the camera body and extending inwardly, its front end being approximately flush with the front of the camera.

I shows the shutter which is combined with the opening at the forward end of the tube, C. This shutter is of bifurcated form and is pivotally connected by a pin or screw $e$ to the front of the camera body. It may be made of pasteboard, rubber, metal or any other suitable material, and it consists essentially as here shown of two rounded portions $i'$ $i^2$ and an intermediate bridge or yokelike portion $i^3$, the latter being the part through which this pivotal connection is made to the camera body, the space between the rounded portions and adjacent the yoke forms the opening $o$ of the shutter through which light passes when the shutter is moved past the lens tube. This shutter is adapted to oscillate on its pivot. While in its normal position one of the rounded portions $i'$ $i^2$ will cover the tube, C, and exclude light from the tube. When the shutter is oscillated one of the rounded portions will leave the tube and the other will cover it, but there will be an opportunity for the entrance of light between the time when one of the rounded portions leaves the end of the tube, C, and the other rounded portion covers the end of said tube.

$I'$ designates an arm which is pivotally connected to the bridge or yokelike portion $i^3$ of the shutter. The free end of this arm $I'$ has connected to it one end of a spring $I^2$ which is shown as consisting of a normally straight piece of steel or other wire. The upper end of this spring is secured in a disk or pivot, $I^4$, which is pivotally connected to the front of the camera body and has an arm, $i^5$, extending radially from it into the bifurcated end of a lever $I^5$, which is pivoted by a screw or analogous device, $i^6$, between its ends, to one of the sides of the camera body.

By oscillating the lever, $I^5$, in one direction the spring $I^2$ will be deflected in such direction as will adapt it to throw the shutter in one direction. An oscillation of the lever $I^5$, in the reverse direction will put the spring, $I^2$, in condition to oscillate the shutter in the reverse direction.

It will be seen that the shutter may be moved from one of its extreme positions to the other to admit light for the taking of a picture, and that after it has been so operated it may be rendered operative in the reverse direction to take another picture. Therefore the shutter has not to be operated for the mere purpose of setting it. Some suitable means may be used to limit the throw of the shutter, and in the present instance the sliding bar $i^{11}$ hereinafter described, operates as such a means, or the side of the box may so operate. No light consequently will be admitted by the shutter except at the time that it is necessary for taking the picture. The free end of the lever $I^5$ is shown as engaging with a projection $I^6$ on the side of the camera body. This projection is shown as stepped. The free end of the lever is sufficiently resilient to enable it to be bent to pass over any one of these steps. It may be engaged with any particular step on either side of the center of the projection, $I^6$, for the purpose of putting any desired tension upon the spring $I^2$.

The shutter has combined with it a detent for retaining it normally in the different positions which it may assume so that it may be released after the setting of the spring $I^2$.

I will now describe the detent mechanism which I have shown in the drawings. The rounded portions $i'$ $i^2$ of the shutter are provided with pins $i^7 i^8$. These pins are adapted to engage with dogs or catches $i^9 i^{10}$ which are pivoted to the front of the camera. They are provided at the upper ends with hooks adapted to engage the said pins and are connected at their lower ends by screws or like devices with a slide bar $i^{11}$, arranged outside the front of the camera body near the bottom. A spring $i^{12}$ serves to move this bar $i^{11}$ in a direction which will cause the hooked ends of the dogs or catches $i^9 i^{10}$ to pass over the pins $i^7 i^8$. This spring permits the swinging of the dogs or catches so that the pins $i^7 i^8$ may push them aside and after moving far enough the spring will swing the dogs or catches in the reverse direction to engage with the pins.

Of course the dogs or catches do not at the same time engage with the pins $i^7 i^8$. When the dog or catch $i^9$ engages with the pin $i^7$ the dog or catch $i^{10}$ will be disengaged from the pin $i^8$.

The slide bar $i^{11}$ has a pin $i^{13}$ projecting from the bottom. With this pin engages a slide $I^8$. This slide bar is provided with a longitudinal slot through which passes a screw or pin $i^{14}$. The slide bar has an upturned end outside one side of the camera body to afford facility for manipulating the slide. When this is pushed inwardly an arm $i^{15}$ with which the slide is provided engages with the pin $i^{13}$, and moves the bar $i^{11}$, in such a direction as to cause the release of the shutter. The forward end of the slide is pointed as shown at $i^{16}$. This pointed end works in a guide $i^{17}$. The result of the pointed or inclined forward end of the slide acting in this guide is to oscillate the slide so that after it has moved the bar $i^{11}$ a certain distance its oscillating movement will disengage it from the pin of such bar and allow the bar to move backwardly to its normal position. A spring, $i^{18}$, moves the slide back to its normal position.

The slide and its appurtenances are covered by a piece or strip of wood or like material $A^2$ in the bottom of the camera body. The shutter, its spring, dogs or catches and the appurtenances of these parts are normally concealed by a front cover, $A^3$, provided with an opening corresponding to the lens tube. This front cover is shown as hinged at the lower edge and secured by a catch $A^4$ at the upper edge.

It is obvious that instead of the shutter being bifurcated and comprising the two rounded parts $I'$, $I^2$, it may be substantially in the form of a portion of a circle, in which event there would be a hole through the shutter, which at proper times becomes coincident with the lens tube.

What I claim as my invention, and desire to secure by Letters Patent, is—

1. The combination in shutter mechanism for photographic cameras, of a shutter provided with an opening, a spring for throwing the shutter and a reversible support for the spring, substantially as set forth.

2. The combination in shutter mechanism for photographic cameras, of a shutter provided with an opening, a spring for throwing the shutter, a reversible support for the spring, means to limit the movement of the shutter and a shutter holding or locking device whereby the movement of the shutter may be controlled, substantially as set forth.

3. The combination in shutter mechanism for photographic cameras, of a shutter provided with an opening, a spring for throwing the shutter, a reversible support for the spring and a spring controlled shutter holding or locking device, substantially as set forth.

4. The combination in shutter mechanism for photographic cameras, of a shutter provided with an opening, a spring for throwing the shutter, a reversible support for the spring, means to limit the movements of the shutter and a spring controlled shutter holding or locking device, substantially as set forth.

5. The combination in shutter mechanism for photographic cameras, of a shutter provided with an opening, a spring for throwing the shutter, a reversible support for the spring and a shutter holding or locking device operated from the exterior of the camera, substantially as set forth.

6. The combination in shutter mechanism for photographic cameras, of a pivoted shutter provided with an opening, a spring for throwing the shutter and an adjustable reversible support for the spring, substantially as set forth.

7. The combination in shutter mechanism for photographic cameras, of a shutter provided with an opening, a support having movement independent of the shutter, a spring connected to the shutter at one end and to the support at the other, and a lever attached to the support whereby it may be turned in either direction whereby the tension of the spring can be reversed, substantially as set forth.

8. The combination in shutter mechanism for photographic cameras, of a shutter provided with an opening, a support having movement independent of the shutter, a spring connected to the shutter at one end and to the support at the other, and a lever attached to the support whereby it may be turned in either direction, and means whereby the support may be held in the several positions, thus regulating the tension of the spring as desired, substantially as set forth.

9. In a camera, the combination of a shutter provided with an opening, a spring for throwing the shutter, a reversible support for the spring, and a detent comprising two dogs and a slider bar, substantially as set forth.

10. In a camera, the combination of a shutter provided with an opening, a spring for throwing the shutter, a reversible support for the spring, a lever for actuating the reversible support, and a projection from the support which engages the lever, substantially as set forth.

11. In a camera, the combination of a pivoted shutter provided with an opening, a lever pivoted to the shutter at one end and at the other end engaging with a spring, a reversible support for one end of the spring, and means whereby the reversible support may be locked in its reversed positions, substantially as set forth.

CHARLES W. EDDY.

Witnesses:
WILLIAM S. HYDE,
W. H. CUTLER.